(12) United States Patent
Zyzak et al.

(10) Patent No.: US 7,214,400 B1
(45) Date of Patent: *May 8, 2007

US007214400B1

(54) FLAVOR ENHANCING OILS

(75) Inventors: David Vincent Zyzak, Cincinnati, OH (US); Robert Leslie Swaine, Jr., Glendale, OH (US)

(73) Assignee: Smucker Fruit Processing Company, Salinas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,458

(22) Filed: Apr. 25, 2000

Related U.S. Application Data

(60) Provisional application No. 60/131,956, filed on Apr. 30, 1999, provisional application No. 60/140,658, filed on Jun. 23, 1999, provisional application No. 60/150,935, filed on Aug. 26, 1999.

(51) Int. Cl.
*A23L 1/22* (2006.01)

(52) U.S. Cl. .................. 426/534; 426/601; 426/613; 426/650

(58) Field of Classification Search .............. 426/534, 426/519, 601, 613, 638, 650, 651
See application file for complete search history.

(56) References Cited

U.S. PATENT DOCUMENTS

| | | | | |
|---|---|---|---|---|
| 2,210,043 | A | 8/1940 | Scherr | 99/123 |
| 3,397,065 | A | 8/1968 | Cunningham et al. | 99/90 |
| 3,645,757 | A | 2/1972 | Gordon et al. | 99/171 CA |
| 3,780,184 | A | 12/1973 | Broderick et al. | 426/65 |
| 3,821,007 | A | 6/1974 | Carey | 106/150 |
| 3,896,975 | A | 7/1975 | Follmer | 222/192 |
| T941,007 | I4 | 12/1975 | Freeman et al. | 252/400 R |
| 4,169,901 | A | 10/1979 | Kravis | 426/601 |
| 4,188,412 | A | 2/1980 | Sejpal | 426/609 |
| 4,192,898 | A | 3/1980 | Hanson, Sr. | 426/250 |
| 4,211,802 | A | 7/1980 | Carey | 426/609 |
| 4,283,429 | A | 8/1981 | Todd et al. | 426/250 |
| 4,285,981 | A | 8/1981 | Todd et al. | 426/250 |
| 4,339,465 | A | 7/1982 | Strouss | 426/293 |
| 4,371,451 | A | 2/1983 | Scotti et al. | 252/305 |
| 4,375,483 | A | 3/1983 | Shuford et al. | 426/330.6 |
| 4,420,496 | A | 12/1983 | Hanson, Jr. et al. | 426/609 |
| 4,443,485 | A | 4/1984 | Escher et al. | 426/538 |
| 4,479,977 | A | 10/1984 | Dashiell et al. | 426/609 |
| 4,543,202 | A | 9/1985 | Bartlett et al. | 252/305 |
| 4,547,388 | A | 10/1985 | Strouss | 426/609 |
| 4,654,221 | A | 3/1987 | Purves et al. | 426/609 |
| 4,670,267 | A | 6/1987 | Chang et al. | 426/41 |
| 4,710,391 | A | 12/1987 | Kirn et al. | 426/289 |
| 4,753,807 | A | 6/1988 | Fuseya et al. | 426/99 |
| 4,806,370 | A | 2/1989 | Toyota et al. | 426/99 |
| 4,842,881 | A | 6/1989 | Kanemaru et al. | 426/307 |
| 4,849,019 | A | 7/1989 | Yasukawa et al. | 106/244 |
| 4,871,558 | A | 10/1989 | Tackikawa et al. | 426/99 |
| 4,963,368 | A | 10/1990 | Antrim et al. | 424/498 |
| 4,976,984 | A | 12/1990 | Yasukawa et al. | 426/602 |
| 4,988,527 | A | 1/1991 | Buckholz, Jr. et al. | 426/536 |
| 5,064,678 | A | 11/1991 | Kleman et al. | 426/611 |
| 5,092,964 | A | 3/1992 | Conte, Jr. et al. | 203/29 |
| 5,153,011 | A * | 10/1992 | Patel et al. | 426/5 |
| 5,156,876 | A | 10/1992 | Clapp et al. | 426/609 |
| 5,183,750 | A | 2/1993 | Nishide et al. | 435/134 |
| 5,296,021 | A | 3/1994 | Clapp et al. | 106/2 |
| 5,338,563 | A | 8/1994 | Mikulka et al. | 426/604 |
| 5,362,892 | A | 11/1994 | Umeda et al. | 554/82 |
| 5,370,732 | A | 12/1994 | Follmer | 106/244 |
| 5,374,434 | A | 12/1994 | Clapp et al. | 426/116 |
| 5,431,719 | A | 7/1995 | Clapp et al. | 106/2 |
| 5,501,867 | A | 3/1996 | Creehan et al. | 426/601 |
| 5,503,866 | A | 4/1996 | Wilhelm, Jr. | 426/609 |
| 5,522,175 | A | 6/1996 | Holtz | 47/1.1 |
| 5,567,456 | A | 10/1996 | Clapp et al. | 426/116 |
| 5,642,860 | A | 7/1997 | Bush et al. | 239/333 |
| 5,650,185 | A * | 7/1997 | Stoltz | 426/115 |
| 5,650,190 | A | 7/1997 | Buikstra et al. | 426/602 |
| 5,662,956 | A | 9/1997 | Knightly | 426/601 |
| 5,674,549 | A | 10/1997 | Chmiel et al. | 426/602 |
| 5,679,390 | A | 10/1997 | Conover | 426/96 |
| 5,695,802 | A | 12/1997 | Van Den Ouweland et al. | 426/533 |
| 5,709,048 | A | 1/1998 | Holtz | 47/1.1 |
| 5,760,277 | A | 6/1998 | Naef et al. | 560/121 |
| 5,780,090 | A | 7/1998 | Freot et al. | 426/534 |
| 6,004,611 | A | 12/1999 | Gotoh et al. | 426/612 |
| 6,022,579 | A | 2/2000 | Mori et al. | 426/603 |
| 6,025,348 | A | 2/2000 | Goto et al. | 514/182 |
| 6,129,944 | A | 10/2000 | Tiainen et al. | 426/577 |
| 6,403,144 | B1 * | 6/2002 | El-Khoury et al. | 426/662 |

FOREIGN PATENT DOCUMENTS

EP  0 021 483  6/1980

(Continued)

OTHER PUBLICATIONS

Anon., AN 398289 FROSTI, abstracting South African Food Review, 1995, p. 52.*

(Continued)

*Primary Examiner*—Leslie Wong
(74) *Attorney, Agent, or Firm*—Calfee, Halter & Griswold, LLP

(57) ABSTRACT

Disclosed are flavor enhancing oils comprising at least one edible liquid oil and at least one water soluble flavor enhancer. The water soluble flavor enhancer is uniformly dispersed throughout the edible liquid oil. Delivery of water soluble flavor enhancers via a stable fat or oil base allows higher temperatures to be obtained during cooking, leading to the formation of enhanced flavors.

20 Claims, No Drawings

FOREIGN PATENT DOCUMENTS

| | | |
|---|---|---|
| EP | 0 256 607 | 2/1988 |
| EP | 0 287 281 | 4/1988 |
| EP | 0 399 544 B1 | 5/1990 |
| EP | 0 495 510 A2 | 1/1992 |
| EP | 0 836 805 A1 | 10/1997 |
| EP | 0 201 041 | 11/1998 |
| GB | 1263390 | 5/1968 |
| GB | 2 021 629 A | 5/1979 |
| GB | 2 185 672 A | 1/1986 |
| WO | WO 91/05481 | 5/1991 |
| WO | WO 95/05748 | 3/1995 |
| WO | WO 95/32610 | 12/1995 |
| WO | WO 95/34222 | 12/1995 |
| WO | WO 96/10927 | 4/1996 |
| WO | WO 98/43497 | 10/1998 |

OTHER PUBLICATIONS

Fennema, O.R., ed., Food Chemistry, Third Edition, 1996, Marcel Dekker, Inc., New York, pp. 734, 735, and 816.*

Patent Abstracts of Japan, vol. 004, No. 140 (C-026), "Antioxidant Preparation", Publication No. 55089383, Publication Date: Jul. 5, 1980, Nippon Oil & Fats Co. Ltd.

Patent Abstracts of Japan, "Oil and Fat Composition", Publication No. 05244869, Publication Date: Sep. 24, 1993, Fuji Oil Co. Ltd.

Drozdowski, et al.: "Effects of polydimethyl siloxane on rapeseed oil transformation during deep frying" Journal Of Food Lipids, vol. 6, No. 3, 1999, pp. 205-213.

"Butter-Flavored Alternative For Foodservice Captures real butter taste" (Accession No. 84 (08) :NO411 FSTA). Abstract from Food Engineering, (1983) 55 (7) 33.

"Mazola Pro Chef Non-Stick Spray for Fat Free Cooking—Original; Olive Oil Manufacturer: Bestfoods Category: Non-Stick Surfacing Products". (Accession No. 1998: 510710 Promt). Abstract from Product Alert, (Sep. 28, 1998).

"Mazola No Stick Butter Flavor Spray Manufacturer: Best Foods Category: Non Stick Surfacing Products". (Accession No. 97: 584437 Promt). Abstract from Product Alert, (Oct. 27, 1997).

"Choosing the Right Antifoam Agent for the Beverage Line". (Accession No. 90; 219930 Promt). Abstract from Beverage Industry, (May 1990) pp. 11.

Parkin, A.R.: "Savoury Flavourings for Meat Products" Institute of Meat Bulletin, XP002145545 Abstract, vol. 75, Publication Date: 1972.

Charalambous, George: "Off-Flavors in Foods and Beverages" Development in Food Science, vol. 28, Publication Date: 1992, pp. 522-545.

Ashurst, P.R., et al.: "Thermal Process Flavorings" Food Flavorings, Second Edition, Publication Date: 1995, pp. 295-297.

Product label: Crisco No-Stick Cooking Spray—Natural Butter Flavor.

Product label: Crisco No-Stick Cooking Spray.

Product label: Professional Crisco—Pan Release.

Product label: Mazola No-Stick Corn Oil Cooking Spray.

* cited by examiner

FLAVOR ENHANCING OILS

PRIORITY CLAIM

This application claims the benefit of priority from U.S. Provisional Applications Ser. Nos. 60/131,956, filed Apr. 30, 1999; 60/140,658, filed Jun. 23, 1999; and 60/150,935, filed Aug. 26, 1999, all of which are herein incorporated by reference.

FIELD OF THE INVENTION

The present invention relates to oils such as cooking oil, cooking spray, and shortening compositions which comprise an effective amount of a water soluble flavor enhancer.

BACKGROUND OF THE INVENTION

Flavor enhancers are substances which have little flavor themselves, but which "enhance" or "intensify" the flavor of the foods to which they are added. The flavor display effected by flavor enhancers is often characterized as "savory" or "full-bodied," and has been termed "umami" by the Japanese.

Water soluble flavor enhancers, such as nucleotide and amino acid flavor enhancers, are among the most common "umani" flavor enhancers. They are commonly available in the form of powders which can be solubilized in food substances having an aqueous phase. In the case of soups, for example, the incorporation of water soluble flavor enhancers is relatively simple, as the flavor enhancers are readily dissolved and uniformly dispersed throughout the soup's aqueous phase.

At relatively high cooking temperatures, water soluble flavor enhancers can decompose into products which provide even more enhanced flavor displays. Delivery of these flavor enhancers via aqueous phase, however, limits the amount of such flavor enhancement that can be provided. When in aqueous phase, the highest temperature that can typically be reached during cooking is about 100° C. (the boiling point of water). Most cooking systems utilizing heated fats or oils, however, operate at temperatures of from about 200° F. to about 500° F. For example, griddling operations utilize temperatures as high as about 400° F. In certain operations, such as deep fat frying, temperatures as high as about 400° F. and above are employed. However, frying oils and grilling fats contain no aqueous phase in which to uniformly disperse these flavor enhancers. Thus, the delivery of water soluble flavor enhancers via frying and grilling operations, and the enhanced flavor displays obtained at higher cooking temperatures, have not been practical.

Accordingly, in order to take full advantage of the flavor benefits that water soluble flavor enhancers can deliver, it would be desirable to provide a cooking oil comprising uniformly dispersed, water soluble flavor enhancers.

SUMMARY OF THE INVENTION

The present invention provides a cooking oil comprising uniformly dispersed, water soluble flavor enhancers. This flavor enhancing oil comprises:

(a) at least one edible liquid oil; and (b) a flavor enhancing amount of at least one water soluble flavor enhancer.

The edible liquid oil can be any suitable edible fat or oil which is solid, plastic, or fluid at room temperature, and liquifiable (i.e. liquid) at room temperature or upon heating. Preferred flavor enhancers include amino acid flavor enhancers, such as monosodium glutamate (MSG), and nucleotide flavor enhancers, such as disodium guanylate and disolium inosinate.

The water soluble flavor enhancers are included in the edible liquid oil at a flavor enhancing amount. Typically, the water soluble flavor enhancers can be included in the edible liquid oil at a level of up to about 20%, more particularly up to about 15%, still more particularly up to about 10%, in one embodiment between about 0.01% to about 7%, more preferably between about 0.01% to about 4%, and still more preferably from about 0.01% to about 2%. The flavor enhancing oil can also contain optional ingredients such as an oxoacid.

The result of preparing foods using these blends is an enhancement of the natural, inherent flavor of the food without the necessity of adding a dominant flavoring, which can be the case with conventional butter flavored sprays and spice flavored cooking oils. Accordingly, the compositions of the present invention can be used to bring out the natural flavor of food, or alternatively, can be used with other flavor ingredients to provide specific desired flavoring (e.g., butter, olive oil, fried flavor notes, spicy, tangy, lemon, garlic, herb).

The food preparation composition is not only useful as a replacement for salad and cooking oils, but it can also be used to formulate other edible fat products such as, but not limited to, shortening, peanut butter, peanut spread, mayonnaise, sauces, gravies, margarine, health bars, snacks, beverages, ice cream, yogurt, cake mix, frosting, donuts, baked goods (e.g., breads and muffins), cheese, and cheese spreads.

The food preparation composition can be used in all applications that call for salad and cooking oil such as stove top cooking (pan frying, sautéing stir frying etc.), baking, and as an ingredient in recipes that are not cooked (salad dressing, mayonnaise).

The invention delivers the above benefits in an oil based form which allows for increased cook temperatures and the resultant increased formation of flavor compounds during cooking.

DETAILED DESCRIPTION OF THE INVENTION

Definitions

As used herein, all percentages (%) are by weight, unless otherwise indicated.

As used herein, "flavor enhancer" refers to a substance which has little flavor itself, but when added to food, has the property of enhancing or intensifying the flavor of the food. Flavor enhancers include, but are not limited to, flavor precursors, flavor potentiators, reaction flavors, and agents that suppress or mask undesirable flavors.

As used herein, the term "food preparation composition" refers to compositions useful in preparing cooked and un-cooked foods, including but not limited to cooking oils, cooking sprays, shortenings, sauces, seasoning compositions, salad dressings, and marinades.

As used herein, the term "edible liquid oil" broadly includes all those edible fats or oils which are solid, plastic, or fluid (i.e., liquid) at room temperature (about 70° F.). Generally, the fat must be liquifiable at room temperature or upon heating. Suitable fats which are solid or plastic at room temperature generally melt or liquefy at those temperatures encountered in cooking operations. Also included by the term are suitable fat and oil substitutes.

As used herein, the term "oil" refers in general to pourable (at room temperature) edible oils derived from animals or plants, including but not limited to fish oils, liquefied animal fats, and vegetable oils, including but not limited to corn, coconut, soybean, olive, cottonseed, safflower oil, sunflower oil, canola, peanut oil, and combinations thereof (hydrogenated, non-hydrogenated, and partially hydrogenated oil). The oil can comprise a liquid, or a combination of liquid and solid particles (e.g., fat particles in a liquid base). In addition, the term "oil" includes fat substitutes, which can be used alternatively or in combination with animal and/or plant oils. A suitable fat substitute is sucrose polyester, such as is available from the Procter & Gamble Co. under the trade name OLEAN®. The following U.S. patents disclose fat substitutes, and are incorporated herein by reference: U.S. Pat. No. 4,880,657 issued Nov. 14, 1989; U.S. Pat. No. 4,960,602 issued Oct. 2, 1990; U.S. Pat. No. 4,835,001 issued May 30, 1989; U.S. Pat. No. 5,422,131 issued Jan. 2, 1996. Other suitable fat substitutes include SALATRIM® brand product from Nabisco and various alkoxylated polyols such as those described in the following U.S. patents incorporated herein by reference: U.S. Pat. Nos. 4,983,329; 5,175,323; 5,288,884; 5,298,637; 5,362,894; 5,387,429; 5,446,843; 5,589,217; 5,597,605; 5,603,978; and 5,641,534.

As used herein, the term "diglyceride" refers to esters of glycerol and fatty acids in which any two of the hydroxyl groups of the glycerol have been esterified with fatty acids. The fatty acids may be the same or different.

As used herein, the term "dairy diglyceride" refers to the diglyceride fraction resulting from the enzymatic or chemical hydrolysis of a dairy food such as milk, cream, butter or cheese.

As used herein the terms "oxoacid" and "alpha keto acid" refer to a compound with the general structure:

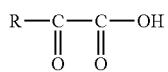

where R can represent hydrogen or a large variety of alkyl groups, saturated or unsaturated, linear or branched, optionally substituted by hydroxy, amino, phenyl, hydroxy-phenyl, carboxy, mercapto, methylthio, guanidino, and other groups. For instance, R can be a hydrocarbon chain, including straight and branched, preferably a hydrocarbon chain having from about 3 to about 10 carbon atoms.

As used herein, "polyglycerol esters" are homologues of glycerides.

As used herein, the term "lecithin" is a generic name for a class of compounds which are mixed esters of glycerol and choline with fatty acids and phosphoric acid, as well as the derivatives thereof. The term "lecithin" includes conventional lecithins, acylated (included acetylated) lecithins, and other suitable lecithin or lecithin-like compounds such as de-oiled lecithin, lysolecithins, phosphatidic acid and its salts, lysophosphatidic acid and its salts, and mixtures thereof.

As used herein, the term "nucleotide flavor enhancer" includes 5'-ribonucleotides and their corresponding derivatives, such as salts thereof.

The Flavor Enhancing Oil

The flavor enhancing oil of the present invention comprises: (a) at least one edible liquid oil, and (b) a flavor enhancing amount of at least one water soluble flavor enhancer.

A. Edible Liquid Oil

The composition of the present invention can include an oil base comprising triglycerides, such as vegetable oil. Alternatively, the composition can have a base comprising a fat substitute, such as a polyol polyester (e.g. sucrose polyester such as olestra), or a combination of triglyceride oil and polyol polyester.

In one embodiment of the present invention, the edible liquid oil can comprise between about 35% and about 99% of the flavor enhancing oil. Alternatively, or in combination with the oil, a fat substitute can be used in the base. A suitable fat substitute is sucrose polyester, such as is available from the Procter & Gamble Co. under the trade name OLEAN®. The following U.S. patents disclose fat substitutes, and are incorporated herein by reference: U.S. Pat. No. 4,880,657 issued Nov. 14, 1989; U.S. Pat. No. 4,960,602 issued Oct. 2, 1990; U.S. Pat. No. 4,835,001 issued May 30, 1989; and U.S. Pat. No. 5,422,131 issued Jan. 2, 1996. Other suitable fat substitutes include SALATRIM® brand product from Nabisco and various alkoxylated polyols such as those described in the following U.S. patents incorporated herein by reference: U.S. Pat. Nos. 4,983,329; 5,175,323; 5,288,884; 5,298,637; 5,362,894; 5,387,429; 5,446,843; 5,589,217; 5,597,605; 5,603,978; and 5,641,534.

A preferred embodiment utilizes a blend of liquid sucrose polyester and a structured triglyceride that is soluble in liquid sucrose polyester such as a triglyceride containing two liquid fatty acid chains (C2 to C10 saturated fatty acid chains or C16–C22 mono- or polyunsaturated chainlengths) and one solid fatty acid chains (C18–C24 saturated fatty acid chainlengths) as described in U.S. Pat. No. 5,419,925, Seiden, issued May 5, 1995 (equivalent to European Patent No. 390,410 B1) and incorporated herein by reference. In vivo lipolysis of the structured triglyceride hydrolyzes the fatty acid moieties from the 1 and 3 positions on the triglyceride leaving 2-monoglycerides. The resulting behenic acid, calcium salts of behenic acid and 2-monobehenin are poorly absorbed and serve as in vivo oil thickening agents for the liquid, nondigestible sucrose polyester and control oil loss. When a flavor enhancing oil of the present invention is made from such a base oil, the final product has the visual appearance and aesthetics of the full fat version but delivers only about 15–25% of the total calories and fat calories.

The flavor enhancers, such as disodium guanylate and disodium inosinate, are generally insoluble in the edible oil. In order to suspend these flavor enhancers in the oil base, the oil base can be gelled, or thickened, to form a matrix which prevents flavor enhancers from settling. Materials that can be used for forming such a matrix include silicon dioxide, food grade waxes, or a matrix of fatty materials such as saturated triglycerides, sucrose polyester solids, oil insoluble fibers, or oil soluble polymers.

In a preferred embodiment, silica is used to form an oil base in the form of a stable gel. In the method for forming this stable gel, the processing steps and the order in which the silica is added are critical for obtaining a stable finished product where the solids do not separate from the liquid phase. First, between about 1.5% and about 2.2%, preferably about 1.8% to about 2%, silica (preferably fumed silica) is added to the oil base. Preferably, a silica having less than about 3.5% moisture is used; silicas having higher moisture content can produce a final product which is too thick at room temperature. The silica is thoroughly mixed with the oil base, with the mixture being agitated until the silica is completely dispersed. Next, the mixture is homogenized using a high shear mixer, such as a Gaulin® mixer, preferably at pressures of at least about 2000 psi. The mixture is then cooled to from about 70° F. to about 80° F. to minimize oxidation.

The flavor enhancer and any additional ingredients, such as lecithin and silicone polymer, can then be added and thoroughly mixed until homogenous. The flavor enhancers are preferably ground to a relatively small particle size to enhance suspension of the particles in the oil carrier. The flavor enhancer particles can be ground to an average particle size of less than about 30 microns, more particularly less than about 20 microns, and in one embodiment less than about 10 microns for suspension in the matrix.

The food preparation composition can also be delivered in the form of a shortening. A typical shortening contains liquid triglyceride oil, an intermediate melting fraction triglyceride (IMF), a small amount of hardstock triglyceride and an emulsifier such as a monoglyceride. The compositions of the present invention can replace all or part of the liquid triglyceride oil and some of the intermediate melting fraction triglyceride and hardstock triglyceride.

A. Flavor Enhancer

The flavor enhancing oil comprises a flavor enhancer that accentuates the cooked flavor of the food prepared therewith. The flavor enhancer can be selected from nucleotide flavor enhancers such as 5'-IMP (5'-inosinic acid) and 5'-GMP (5'-guanylic acid), or their corresponding salts such as disodium guanylate, disodium inosinate, dipotassium guanylate, dipotassium inosinate, and mixtures thereof. Especially preferred are mixtures wherein the ratio of disodium guanylate to disodium inosinate is between about 1:0 to about 0:1, and more preferably from about 1:0 to about 0.5:0.5. A suitable 0.5:0.5 combination of disodium guanylate and disodium inosinate is commercially available from the Takeda Company, under the Ribotide® brand name.

Other suitable flavor enhancers include amino acid flavor enhancers such as monosodium glutamate (MSG), monopotassium glutamate, and mixtures thereof. Additional suitable flavor enhancers include, but are not limited to, maltol, ethyl maltol, nucleotide-containing compositions derived from shiitake or other suitable mushrooms, disodium succinate (SSA), suitable cultured whey proteins such as Flavor Whey (available from the PTX Corporation), and mixtures thereof.

Suitable yeast extracts, such as autolyzed yeast extracts (AYE), can also be used. Preferred yeast extracts are naturally rich in 5'-nucleotides and include Yeast Extract 2006 from the BioSpringer Company and Flavor Mate 950, Flavor Mate 960, and Flavor Mate 945, all available from Red Star BioProducts. Suitable carbohydrate decomposition products, such as Furaneol®, available from the Firmenich company, can also be used.

An especially preferred flavor enhancer comprises a combination of MSG with a nucleotide flavor enhancer such as disodium guanylate, disodium inosinate, or mixtures thereof.

The flavor enhancing oil comprises a flavor enhancing amount of at least one water soluble flavor enhancer. The flavor enhancing oil can comprise up to about 20% flavor enhancer, more particularly up to about 15%, still more particularly up to about 10%, in one embodiment between about 0.01% to about 7%, more preferably between about 0.01% to about 4% flavor enhancer, and still more preferably from about 0.01% to about 2% flavor enhancer.

B. Optional Ingredients

1. Anti-Stick Agent

The food preparation composition of the present invention can comprise an anti-stick agent, such as lecithin or modified lecithin (such as acetylated lecithin) for reducing the tendency of food to adhere to cooking utensils, and to provide browning. Without being limited by theory, it is believed that lecithin, in the appropriate amount, can act synergistically with the oxoacids and flavor enhancer to deliver an improved brown/fried color and flavor to cooked foods.

The composition can comprise up to about 20% lecithin, more particularly up to about 15% lecithin, still more particularly up to about 10% lecithin, and in one embodiment between about 0.5% and about 7% lecithin, more preferably between about 0.5% and about 4% lecithin. A suitable lecithin is commercially available from the Central Soya Co., as CENTROPHASE® 152 brand. A suitable acylated lecithin is the acetylated lecithin commercially available from the Central Soya Co. as CENTROPHASE® HR brand. Other suitable lecithin or lecithin-like compounds which can be used include de-oiled lecithin, lysolecithins, phosphatidic acid and its salts, and lysophosphatidic acid and its salts.

The use of a silica compound, such as silicon dioxide, also imparts anti-stick properties to the food preparation composition. Especially preferred is the used of lecithin in combination with silicon dioxide for producing the desired anti-stick effects. Fumed silica is a preferred form of silicon dioxide. A suitable fumed silica is commercially available from Degussa, Inc., under the trade name Aerosil® 380. The composition can comprise up to about 10%, preferably up to about 5%, more preferably up to about 3%, and most preferably up to about 2%, of a silica compound or mixtures thereof.

2. Mouthfeel Agent

The flavor enhancing oil of the present invention can comprise a mouthfeel agent for increasing the actual or perceived lubrisciousness of the food cooked with the composition. In one embodiment of the present invention, the composition comprises diglyceride, oxoacids, or combinations thereof for providing a lubricious mouthfeel.

The composition can comprise between about 0.0005% to about 2% diglyceride. (This amount of diglyceride is in addition to that which may comprise the edible liquid oil.) Suitable diglycerides include those from edible plant or animal precursors. A preferred diglyceride comprises dairy diglyceride.

The composition can comprise between about 0.000005% and about 0.005% by weight oxoacids. The oxoacid can comprise oxopropanoic acid, oxobutanoic acid, oxopentanoic acid, oxohexanoic acid, oxoheptanoic acid, or mixtures thereof. The oxoacid can also comprise an oxoacid selected from the group consisting of glyoxilic acid, 2-oxopropanoic acid, 2 oxobutanoic acid, 3-methyl-2-oxobutanoic acid, 3-methyl-2-oxo-pentanoic acid, 4-methyl-2-oxo-pentanoic acid, 3-hydroxy-2-oxo-propanoic acid, 3-hydroxy-2-oxobutanoic acid, oxolacetic acid, 2-oxo-glutaric acid, 2-oxo-3-phenylpropanoic acid, 3-(4-hydroxyphenyl)-2-oxopropanoic acid, 2-oxo-1H-indol-3-propanoic acid, 4-(methylthio)-2-oxo-pentanoic acid, 6-amino-2-oxo-hexanoic acid, 3-mercapto-2-oxo-propanoic acid, 3-methyl-2-oxo-hexanoic acid, 3-methyl-2-oxo-heptanoic acid, and mixtures thereof.

A suitable combination of dairy diglyceride and oxoacid having a butter flavor is available from the Firmenich Company of Geneva, Switzerland.

3. Anti-Foaming Agents

The food preparation composition can comprise silicone polymer to reduce the foaming of the composition during cooking. The silicone polymer is present at such a level as to have no detectable taste or aroma or flavor. The food preparation composition can comprise from about 1 ppm to about 1000 ppm, preferably from about 4 ppm to about 200 ppm, and more preferably about 10 ppm, silicone polymer.

A preferred silicone polymer is polydimethylsiloxane. Preferably, the polydimethylsiloxane has a viscosity of from about 200 to about 1200 centistokes at 25° C., more preferably from about 300 to about 1,050 centistokes at 25° C., and most preferably about 350 centistokes at 25° C. A particularly suitable commercially available polydimethylsiloxane is Dow® 200 Fluid brand, available from Dow Chemical Company.

The use of a silica compound, such as silicon dioxide, also imparts anti-foam properties to the food preparation composition. Especially preferred is the use of silicone polymer in combination with silicon dioxide for producing the desired anti-foam effects. Fumed silica is a preferred form of silicon dioxide. A suitable fumed silica is commercially available from Degussa, Inc., under the trade name Aerosil® 380. The composition can comprise up to about 10%, preferably up to about 5%, more preferably up to about 3%, and most preferably up to about 2%, of a silica compound or mixtures thereof.

4. Other Ingredients

Additional flavor ingredients and masking agents can be included in the flavor enhancing oil. Such additional flavor and masking agents include, but are not limited to, terpene hydrocarbons and sunflower oil. Terpene hydrocarbons may be predominantly pure compounds, such as d-limonene; or byproducts of the citrus processing industry, such as cold pressed citrus oils (e.g., lemon, lime, orange, grapefruit, tangerine), citrus essence, or phase oils; or may be terpene mixtures separated from peel or essence oils by distillation or extraction. Natural and artificial meat flavors can also be used.

The compositions of the present invention can also include ingredients including, but not limited to, antioxidants, chelating agents, amino acids (e.g. alpha amino acids such as cysteine, methionine, lysine, and glycine), artificial and natural sweeteners including sugar (e.g., sucrose, fructose, xylose), vitamins (e.g., Vitamins A, C, E, and the B vitamins), and other nutrients and minerals. For example, the compositions of the present invention can include flavor precursors such as alpha-amino acids, protein hydrolysates, yeast autolysates, reducing compounds, vitamins, and mixtures thereof.

The compositions of the present invention can include one or more emulsifiers including, but not limited to, monoglycerides, diglycerol oleate, diglcerol linoleate, and/or coemulsifiers and cosolvents (e.g., ethanol). The compositions may also include an ingredient such as enzyme modified egg yolk for use in an oil in water emulsion.

The food preparation compositions of the present invention, according to one embodiment, can have a pH which is between about 4 and about 7, and more particularly between about 5 and about 6. Without being limited by theory, it is believed that such a pH range can be desirable to control browning of food prepared with the flavor enhancing oils of the present invention. The pH of the food preparation composition can be controlled by the addition of a suitable edible acid, such as citric acid.

EXAMPLES

The following examples are illustrative of the present invention, but are not meant to be limiting thereof.

Example 1

Example 1 describes a food preparation composition having a gelled oil base.

Materials and Formula:

A food preparation composition according to the present invention can be made according to the following procedure:

First, a gel matrix having the following formula is formed:

Gel Matrix:

|  | % wt. | Grams |
|---|---|---|
| Oil (Crisco ® Natural Blend brand lot #8344A) | 73 | 10,220 |
| Sunflower Oil (Wesson ® brand lot #M8C8) (sunflower helps mask flavor of lethicin and diglyercide) | 25 | 3500 |
| Silicon Dioxide powder (Aerosil ® 380 brand from Degussa, Lot #B06227D) | 2 | 280 |

Procedure:

Balance: Mettler PC 16 (SW 13172)

1. Weigh into a 5 gallon plastic bucket the Crisco® Natural Blend. Add in the Sunflower oil and finally weigh in the Aerosil® silica. Record actual amounts of each component added.
2. Mix components using a Lightnin® Series 30 mixer, equipped with a 2.5 inch; 4 blade; high pitch propeller, at a speed setting of 40 for 2 minutes until all of the silica is wetted.
3. Reduce speed setting to 25, to reduce surface turbulence, and continue stirring for an additional 10 minutes to assure all silica lumps are dissolved and the mixture is uniform.
4. Next, process the mixture through a Gaulin® Homogenizer (Type: 15M8TA; S/N 1818551) using 6000 psi to press through orifice (Product exit temperature=115° F.), collecting product in stainless steel bucket. Cover with aluminum foil until the gel matrix is used in preparing the food preparation composition.

The food preparation composition is then prepared using the following formula:

|  | % wt | grams |
|---|---|---|
| Gelled Oil (from above) | 95.45 | 13100 |
| Lethicin (Centrophase ® 152 (6004) brand from Central Soya, Lot #98155208) | 3.50 | 480.4 |
| Oxoacid and dairy diglyceride combination (Firmenich; Lot #3709261.16NII) | 0.25 | 34.3 |
| Ottens Browned Butter Flavor (Ottens Flavor #6913) (masking agent) | 0.0026 | 0.4 |
| Ribotide ® (Takeda, Lot #PY07A) | 0.80 | 110.0 |

Procedure:

Balance: Mettler PC 16 (SW 13172))
1. Transfer the gelled oil (above product) to a tared 5 gallon plastic bucket Weigh in the lecithin, oxoacid and dairy di glyceride, and the browned butter flavor according to the formula above. Record actual weights of each component added.
2. Mix components using a Lightnin® Series 30 mixer, equipped with a 2.5 inch; 4 blade; high pitch propeller, at a speed setting of 30 for 2 minutes to blend components.
3. Slowly add the Ribotide®, avoiding clumping, while the mixture is stirred at a speed setting of 30. Addition time: 4.5 minutes.
4. Reduce mixer speed setting to 20 to reduce the work being put into the gelled oil.

Example 2

A second embodiment of the invention can be made according to the following example:

Ingredients:

|  | % | Weight (g) |
|---|---|---|
| Vegetable Oil (Crisco ® Natural Blend brand) | 94.95 | 284.85 |
| Lecithin (Centrophase 152 (6004) Central Soya) | 3.50 | 10.50 |
| Ribotide ® (Takeda) | 0.80 | 2.40 |
| Wax (Polyethylene Homopolymers, Baker Petreolite X-2068) (batch #SS37774) | 0.75 | 2.25 |

Procedure:

1. Weigh the above four ingredients into a 1 L beaker using a two-place balance.
2. Heat the combined ingredients in a 250° F. oven for 30 minutes to completely melt wax.
3. Stir with glass rod to completely mix the four ingredients.
4. Rapidly crystallize mixture by pouring evenly onto a 32° F. baking sheet (18"×26"×1"). This temperature is maintained by placing one sheet over a second sheet containing a water and ice mixture. Total crystallization is 5 minutes.
5. Scrape sample from pan using rubber spatula.

The final product is pourable at room temperature.

Example 3

This example illustrates an embodiment of the present invention wherein the flavor enhancing oil comprises a base of liquid shortening.

Formula:

| Ingredient | % | Wt (grams) |
|---|---|---|
| Frymax ® Brand Liquid Shortening Lot 092298D | 95.45 | 381.8 |
| Lecithin Centrophase 152 (6004) Lot 98155208 | 3.5 | 14.0 |
| Ribotide (Takeda Lot PY07A) | 0.8 | 3.20 |
| Mouthfeel Flavor (Firmenich Lot 3709261.16NII) | 0.25 | 1.0 |
| Butter Flavor (Otten Lot 6913) | 0.0026 | 0.01 |

Procedure:

1. Weigh all the above ingredients except the Ribotide® into a 1L stainless steel beaker using a two-place balance.
2. Mix for 2 minutes at speed setting of 30 on a Lightnin® series 30 mixer.
3. Slowly add the Ribotide into the mixture over a 30 second period and mix an additional 5 minutes at the same speed setting as Step 2.
4. Pour the material into glass sample jar or other appropriate storage container.

INCORPORATION BY REFERENCE

All of the aforementioned patents, publications, and other references are herein incorporated by reference in their entirety.

What is claimed is:

1. A flavor-enhancing oil comprising:
   a) at least one liquid edible oil;
   b) 1.5 to 2.2% by weight of a matrix-forming material comprising silicon dioxide;
   c) a flavor-enhancing amount of at least one water-soluble particulate flavor enhancer, wherein said water-soluble particulate flavor enhancer is dispersed throughout said edible liquid.

2. The flavor enhancing oil of claim 1, wherein said water soluble particulate flavor enhancer comprises at lease one nucleotide flavor enhancer.

3. The flavor enhancing oil of claim 1, wherein said water soluble particulate flavor enhancer comprises at lease one amino acid flavor enhancer.

4. The flavor enhancing oil of claim 2 wherein said nucleotide flavor enhancer is selected from the group consisting of disodium guanylate, disodium inosinate, and mixtures thereof.

5. The flavor enhancing oil of claim 3 wherein said amino acid flavor enhancer comprises MSG.

6. The flavor enhancing oil of claim 4, wherein the ratio of disodium guanylate to disodium inosinate is between about 1:0 to about 0:1.

7. The flavor enhancing oil of claim 5, further comprising disodium guanylate and disodium inosinate, wherein the ratio of disodium guanylate to disodium inosinate is between about 1:0 to about 0:1.

8. The flavor enhancing oil of claim 6 wherein the ratio of disodium guanylate to disodium inosinate is between about 1:0 to about 0.5:0.5.

9. The flavor enhancing oil of claim 7 wherein the ratio of disodium guanylate to disodium inosinate is between about 1:0 to about 0.5:0.5.

10. The flavor enhancing oil of claim 1, wherein said water-soluble particulate flavor enhancer has an average particle size of less than about 30 microns.

11. The flavor enhancing oil of claim 1, wherein said water-soluble particulate flavor enhancer has an average particle size of less than about 20 microns.

12. The flavor enhancing oil of claim 1, wherein said water-soluble particulate flavor enhancer has an average particle size of less than about 10 microns.

13. A method for preparing a flavor enhancing oil, comprising the steps of:
   a) adding from 1.5% to 2.2% of a matrix-forming material comprising silicon dioxide to an edible oil base;
   b) mixing the oil and silica of step a until the silicon dioxide is completely dispersed in the oil;

c) homogenizing the completely dispersed silicon dioxide and oil mixture of step b;
d) cooling the homogenized silicon dioxide and oil mixture to a temperature in the range from 70° F. to 80° F.; and
e) mixing a flavor enhancing amount of one or more particulate, water soluble flavor enhancers into the cooled, homogenized silicon dioxide and oil mixture;
wherein the particulate water-soluble flavor enhancers remain suspended in the oil.

14. The method of claim 13 wherein the water-soluble particulate flavor enhancers comprise at least one nucleotide flavor enhancer.

15. The method of claim 14 wherein the nucleotide flavor enhancer is selected from the group consisting of disodium guanlyate, disodium inosinate, and mixtures thereof.

16. The method of claim 13 wherein the water-soluble particulate flavor enhancers comprise at least one amino acid flavor enhancer.

17. The method of claim 16 wherein the amino acid flavor enhancer comprises MSG.

18. The method of claim 13 wherein the water-soluble particulate flavor enhancer comprises at least one nucleotide flavor enhancer and at least one amino acid flavor enhancer.

19. The method of claim 13 wherein the water-soluble particulate flavor enhancer has an average particle size of less than 30 microns.

20. A flavor enhancing oil prepared by the process of claim 13.

* * * * *